(12) United States Patent
Foster et al.

(10) Patent No.: US 7,740,891 B2
(45) Date of Patent: Jun. 22, 2010

(54) HAND-HELD OATMEAL

(75) Inventors: David V. Foster, Mount Prospect, IL (US); Christopher True, Bartlett, IL (US)

(73) Assignee: The Quaker Oats Company, Chicago, IL (US)

( * ) Notice: Subject to any disclaimer, the term of this patent is extended or adjusted under 35 U.S.C. 154(b) by 905 days.

(21) Appl. No.: 11/408,896

(22) Filed: Apr. 21, 2006

(65) Prior Publication Data

US 2008/0089980 A1   Apr. 17, 2008

(51) Int. Cl.
*A23L 3/00*  (2006.01)
*A23P 1/10*  (2006.01)

(52) U.S. Cl. .............. 426/460; 426/462; 426/392; 426/407; 426/465; 426/449

(58) Field of Classification Search .............. None
See application file for complete search history.

(56) References Cited

U.S. PATENT DOCUMENTS

| | | | | |
|---|---|---|---|---|
| 3,903,308 A | * | 9/1975 | Ode | 426/93 |
| 4,642,968 A | * | 2/1987 | McHenry et al. | 53/425 |
| 5,035,913 A | * | 7/1991 | Sky | 426/619 |
| 5,039,001 A | * | 8/1991 | Kinigakis et al. | 229/120 |
| 5,817,355 A | * | 10/1998 | Zukerman et al. | 426/272 |
| 6,607,760 B2 | * | 8/2003 | Burri et al. | 426/74 |

\* cited by examiner

*Primary Examiner*—Jennifer C McNeil
*Assistant Examiner*—Hong Mehta
(74) *Attorney, Agent, or Firm*—Banner & Witcoff, Ltd.

(57) ABSTRACT

A hand-held oatmeal product is provided that is ready to eat. The oatmeal product may be packaged in a retortable pouch. Methods of making the oatmeal product are provided.

13 Claims, 2 Drawing Sheets

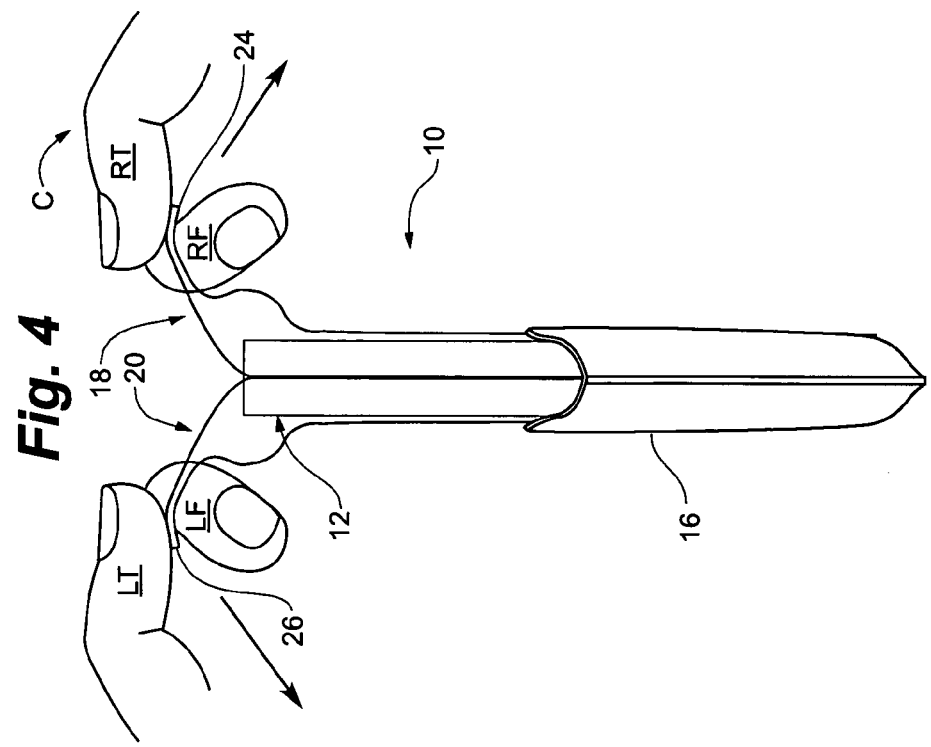
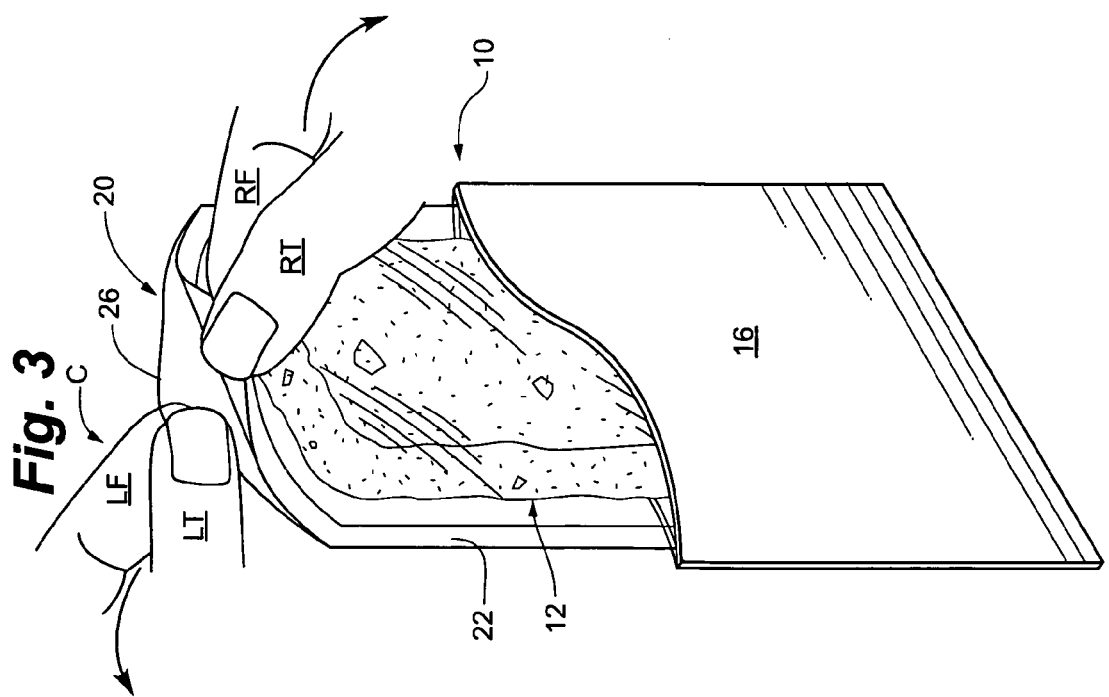

HAND-HELD OATMEAL

FIELD OF THE INVENTION

The present invention relates to oatmeal products. More particularly, the present invention relates to oatmeal products that can be conveniently hand-held during consumption.

BACKGROUND OF THE INVENTION

The nutritional value and health benefits of oatmeal are well known and recognized. The consumption of oatmeal has been shown to reduce total cholesterol concentrations in humans, among other benefits. High concentrations of cholesterol are linked to a higher likelihood of heart attacks. Thus, there is a need for increased consumption of oatmeal. Traditionally, a bowl and spoon have been required to eat hot, prepared oatmeal, preventing oatmeal from being conducive to "on-the-go" consumption.

A need exists for an oatmeal product that has the health benefits of traditional prepared oatmeal yet is convenient and easy to consume "on-the-go." A need also exists for such an oatmeal product to be convenient and not messy to consume and which has good texture and flavor characteristics.

SUMMARY OF THE INVENTION

In accordance with one aspect of the present invention, a process of making a hand-held oat food product is provided. The process may comprise combining ingredients comprising oats and at least one other edible material and water, cooking said ingredients, cooling the cooked ingredients into a soft, solidified mass and dividing the soft, solidified mass into smaller portions. Thereafter, the smaller portions can be packaged. The product in accordance with the invention can be made of all natural ingredients and without any added preservatives, nutrients or thickening agents.

The packaging can be of any suitable type. For example, the packaging may comprise a film pouch that can readily be peeled open so that the product can be easily and neatly consumed in one hand. These pouches can be contained in an insulated sleeve so that the product can be kept warm and comfortably carried in the consumer's hand after heating which can be done in a microwave, if desired. Preferably, the container for the product, which container may be a pouch, is retortable.

In accordance with another aspect of the present invention, after cooking, the ingredients can be divided into desired portions prior to cooling and packaging.

In accordance with another aspect of the present invention, the other edible material can be one or more edible materials selected from fruits, vegetables, dairy products, sugars, juices, meat, vitamins, minerals and combinations thereof.

In accordance with another aspect of the present invention, the oats utilized in the product can be of any suitable variety, including but not limited to steel cut oats, rolled oats, whole oats and combinations thereof.

In accordance with one aspect of the invention, the product is sterilized, which can be done by retorting before or after the product is packaged in a suitable container which typically will be a sealed container and can be a retortable pouch.

Typically, the ingredients will be cooked for a period of time of from about 20 minutes to about 60 minutes at a temperature of from about 120° F. to about 240° F.

In accordance with a further aspect of the invention, the packaging includes packaging the individual-portioned product into a sealed container, which can be done at atmospheric pressure, and purging the interior of the sealed container with nitrogen which can occur while the product is inside the container or before the product is placed therein to substantially remove any oxygen inside the container and thereafter sealing the container. The oatmeal product contained therein is ready to eat and can be heated if desired by any suitable method, such as in a microwave oven.

In another aspect of the invention, the sealed container may be both microwaveable and retortable.

In accordance with another aspect of the invention, a hand-held food product is provided comprising a soft, solidified mass of cooked oats packaged in a retortable container. In accordance with one aspect of the invention, the package is sealed and retorted thereby resulting in a hand-held food product that comprises a retorted soft, solidified mass of cooked oats and at least one other edible material. Typically, the soft, solidified mass will be self supporting. Thus, it does not crumble apart when eaten but rather is maintained in a self-supporting solidified mass, thereby making consumption more convenient. This is done by adjusting the amount of water in the product such that water is present in an amount of from about 35% to about 60% by weight of the total composition. Preferably, the hand-held food product has a water activity of greater than about 0.90.

In accordance with still another aspect of the invention, a hand-held food product is provided that comprises a soft, solidified mass that is composed of cooked oats, at least one other edible item and water that is packaged in a retortable container. The water may be present in an amount of from about 35% to about 60% by weight of the total composition and typically has a water activity of from about 0.90 to about 0.99. More typically, water will be present in an amount of from about 40% to about 50% by weight of the total composition.

In accordance with another aspect of the invention, the other edible material is selected from fruits, vegetables, dairy products, spices, sugars, juice, meat, vitamins, minerals and combinations thereof.

In addition, the hand-held food product may be packaged in a retortable container that has a nitrogen atmosphere. Such atmosphere is effective in preventing degradation of the appearance, taste and texture of the food product.

BRIEF DESCRIPTION OF THE DRAWINGS

FIGS. 3 and 4 illustrate the opening of a food product in accordance with the invention; and

DETAILED DESCRIPTION OF THE INVENTION

Figure 1:
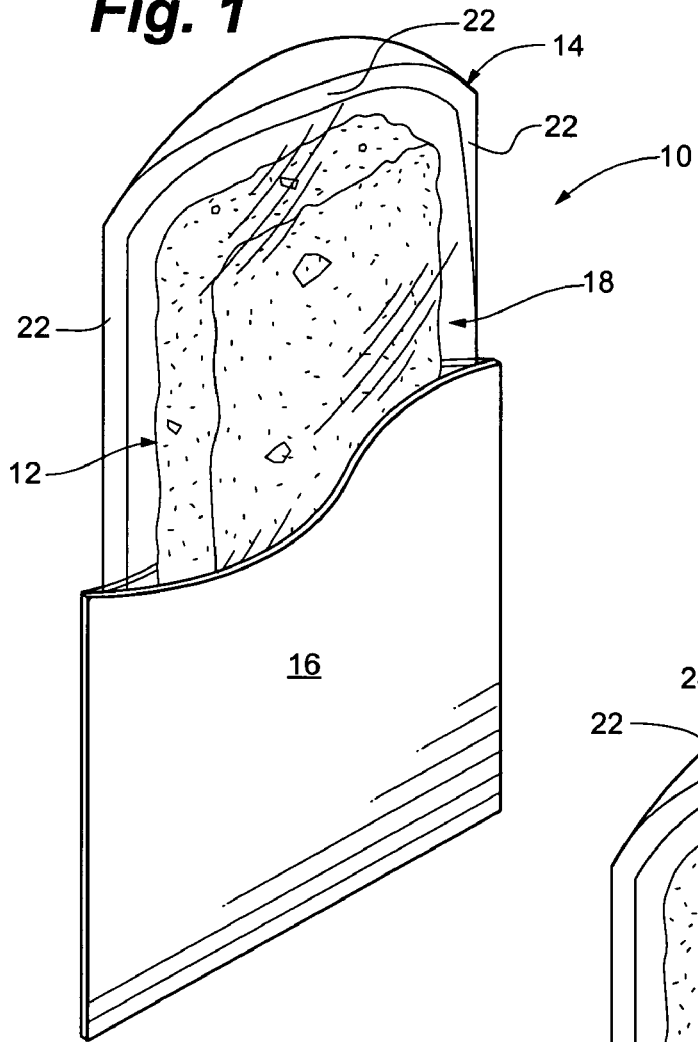
FIG. 1 illustrates a food product in accordance with the invention packaged in a container that is further contained in an outer sleeve.
Figure 2:
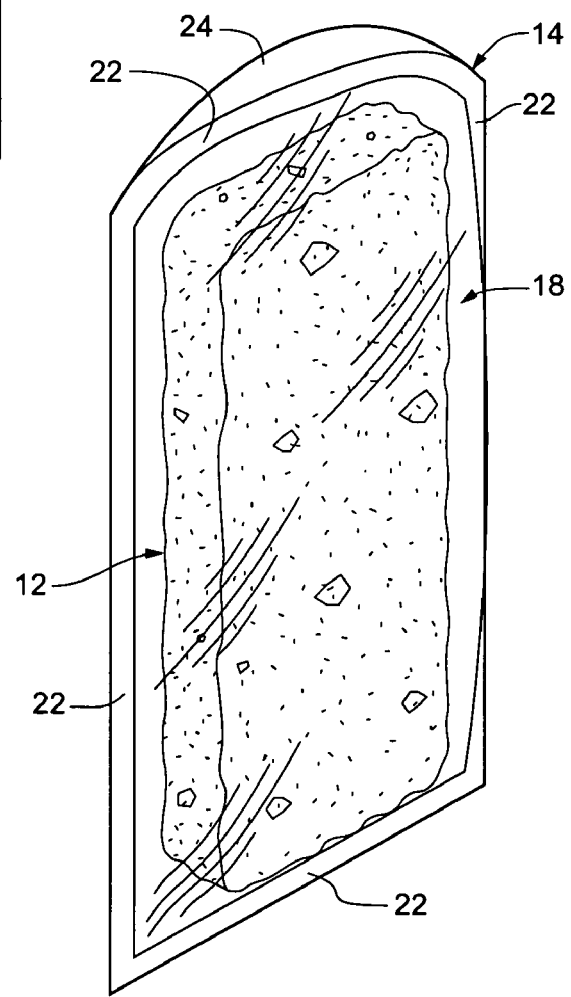
FIG. 2 illustrates the container of FIG. 1 being removed from the sleeve.

Referring to the Figures generally and in particular to FIGS. 1-3, there is illustrated a packaged ready-to-eat food product 10 in accordance with the invention. Packaged food product 10 is composed of a soft, solidified mass 12 that is contained within a retortable container 14 which, in turn, is contained within a protective sleeve 16. Alternatively, the packaged food product 10 could be refrigerated or even frozen without retorting. Suitable preservatives can be added for a refrigerated product that is not retorted. For a shelf-stable product, retorting is needed.

The products of the invention may contain other ingredients, as desired. Examples of optional additional ingredients include, but are not limited to, salt, hydrocolloids, polysaccharides, thickeners, sweeteners—artificial or natural, caffeine, dairy, coffee solids, tea solids, herbs, nutraceutical compounds, electrolytes, vitamins, minerals, amino acids, preservatives, alcohol, colorants, emulsifiers, and oils as known in the art.

Preferably, the food product provides at least 0.8 grams of soluble fiber per serving and at least 2.5 grams of total fiber content per serving. It is well known in the art how to vary the amounts and types of different parts of the fluid food to achieve a desired fiber content.

Packaged food product 10 is of a size such that it can be conveniently held by hand and thus is a hand-held food product.

Soft, solidified mass 12 is composed of cooked oats and at least one other edible material and water present in an amount sufficient to provide a total moisture content of from about 35% to about 60% by weight of the total composition. By total moisture content is meant the total amount of water present in the composition. Typically, soft, solidified mass 12 has a water activity of greater than about 0.90.

Soft, solidified mass 12 more typically will be composed of total water in an amount of from about 40% to about 60% by weight of the total soft, solidified mass and preferably from about 40% to about 50% by weight of the total soft, solidified mass. Soft, solidified mass 12 is self-supporting and has sufficient structural integrity such that it can be eaten as a hand-held food item without crumbling or otherwise falling apart. Thus, soft, solidified mass 12 is a nutritious oat-based food product that can be conveniently consumed "on-the-go." Nor is there any need as in conventional oatmeal to consume it with a spoon and bowl.

As illustrated in FIGS. 1 and 2, soft, solidified mass 12 has been sterilized to commercial sterilization standards by retorting in retortable container 14 into which soft, solidified mass 12 has been sealed. Commercial sterilization of low acid food is generally accomplished by retorting the food under sufficient pressure and temperature for a time sufficient to kill the microbe that causes botulism. This process renders food shelf-stable. High acid foods have a pH lower than about 4.6 and low acid foods have a pH higher than about 4.6. The container can be commercially sterilized by other methods including the application of hydrogen peroxide. Commercial sterilization can be determined as is known in the art by inoculating food with spores of the bacteria *Bacillus subtillis* var. *globigii* and subjecting the inoculated sample to the sterilization process and checking to determine if at least a 6 log reduction of viable spores after sterilization has occurred. In the illustrated embodiment, soft, solidified mass 12 has been sealed with a retortable container 14 which is a retortable pouch. The retortable pouch may be transparent (as container 14 is illustrated) or may be opaque with desired indicia thereon. Such retortable pouches are well known in the art and consequently a detailed description of such pouches is not provided herein.

The oats that are utilized to make soft, solidified mass 12 can be any suitable oats including, steel cut oats, rolled oats, whole oats and combinations thereof.

Soft, solidified mass 12 can be composed entirely of natural materials without any thickeners, gums or added nutrients or preservatives, for example. Such materials, however, if desired, can be incorporated into soft, solidified mass 12.

In addition, soft, solidified mass 12 can include any one or more of a variety of fruits, vegetables, dairy products, spices, sugars, juices, meats, vitamins, minerals, flavors and combinations thereof.

In addition, soft, solidified mass 12 is contained within retortable container 14 in a nitrogen atmosphere. The presence of a nitrogen atmosphere instead of air or oxygen helps preserve the taste, appearance and texture of soft, solidified mass 12.

Retortable container 14 is composed of two opposed sheets of material 18 and 20, respectively. A seal 22 is located around the periphery of container 14, which is an air impervious seal. Opposed sheets 18 and 20 are unattached at an outer upper edge region 24 and 26 as shown in FIGS. 3 and 4. As illustrated in FIGS. 3 and 4, to open container 14 to permit consumption of soft, solidified mass 12, the consumer C using right and left thumb and forefingers RT/RF and LT/LF, respectively, merely grasps each of opposed sheets 18 and 20 at respective outer upper edge regions 24 and 26 and pulls opposed sheets 18 and 20 apart about peripheral seal 22. This is akin to peeling apart a banana to thereby reveal the contents inside ready for consumption which in this case is soft, solidified mass 12. Soft, solidified mass 12 can be consumed while contained in sleeve 16 or taken out of sleeve 16, if desired.

If retorting is desired, a food product in accordance with the invention can be retorted after being contained and packaged in retortable container 14. Alternatively, a food product in accordance with the invention can be retorted before being packaged, and after retort, can be packaged in sterile conditions in a sterile package. Typically, it is anticipated that the retorting would occur after the product is packaged.

Food products in accordance with the invention can be made if desired without any added preservatives, thickening agents or nutrients. If desired, such materials can be added. In addition, a material or materials selected from starches and gums can be added to facilitate holding the food product together in a self-supporting mass.

Alternatively, the packaged food product 10 could be refrigerated or even frozen without retorting. Suitable preservatives can be added for a refrigerated product that is not retorted. For a shelf-stable product, retorting is needed.

Soft, solidified mass 12 can be produced by any suitable process. A process of the present invention includes co-mixing the ingredients, which may be by mixing, and thereafter cooking them for a suitable period of time. The amount of time necessary to cook the ingredients of soft, solidified mass 12 depends on the type and amount of ingredients. Typically, for steel cut oats formulas as set forth in the Examples, the cooking will take place for from about 30 to about 40 minutes and more typically about 30 minutes at about 180° F. Steel cut oats tend to hold together in a self-supporting mass better than other types of oats, such as instant or flaked oats. If other types of oats are used, at least a sufficient amount of steel cut oats should be present to form a self-supporting mass, which typically should be at least about 50% and preferably at least 75% or more on a weight basis of the oats.

After cooking, the resulting product is formed into a desired shape, which can be in the shape of a large bar or slab, or any other desired shape, for example. Formation of the cooked ingredients can be performed by any suitable method and apparatus. Thereafter, the formed shape, which may be a slab, is cooled which may be done by use of a cooling tunnel to "set" or solidify the cooked ingredients into a soft, solidified mass.

Typically, the solidified slab is then divided into desired shapes and packaged, preferably in a retortable pouch material, which may be in the form of a pouch.

During packaging, the retortable pouch material or other packaging can be purged with nitrogen gas to remove oxygen. Thereafter, the pouch is sealed and sterilized, which typically will be done by retorting until the point of commercial sterility. Alternatively, the product could be sterilized prior to packaging and then packaged in a sterile container and environment. Typically, it is anticipated that retorting would occur after packaging in a retortable pouch or other container.

The present invention is further illustrated by the following Examples.

Example 1

A mixed berry food product in accordance with the invention can be made using the following formula:

| Ingredient | Parts by Weight |
|---|---|
| Steel Cut Oats | 30.0 |
| Apple Juice Concentrate (Specify concentration) | 3.0 |
| Added Water | 39.0 |
| Heavy Whipping Cream | 10.0 |
| Brown Sugar | 3.0 |
| Cinnamon | 0.04 |
| Raspberries (fresh) | 5.0 |
| Strawberries (fresh) | 5.0 |
| Blueberries (fresh) | 5.0 |

All of the ingredients are cooked for about 30 minutes at 180° F. The cooked product is formed into a slab and cooled to form a soft, solidified mass. The soft, solidified mass can be cut into a final desired shape, packaged in a retortable container and subsequently retorted to commercial sterility.

Example 2

A cheese and onion food product in accordance with the invention can be made using the following formula:

| Ingredient | Parts by Weight |
|---|---|
| Steel Cut Oats | 31.7 |
| Added Water | 39.6 |
| Cream | 12.7 |
| Sugar Caramelized Onion | 12.7 |
| Cheese Paste | 2.9 |
| Onion Paste | 0.5 |

The ingredients can be processed in a manner as set forth in Example 1 and can have a water content in the first product of from about 35% to about 60% by weight of the total product.

Example 3

A mushroom food product in accordance with the invention can be made using the following formula:

| Ingredient | Parts by Weight |
|---|---|
| Steel Cut Oats | 32.3 |
| Portabella Mushroom | 12.9 |
| Heavy Whipping Cream | 12.9 |
| Demi Glaze Base | 0.5 |
| Roasted Garlic Base | 0.16 |
| Mushroom Base | 0.16 |
| Scallions (fresh) | 0.8 |
| Added Water | 40.3 |

The ingredients can be processed in a manner as set forth in Example 1.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A process of making a hand-held oat food product comprising:
   combining ingredients comprising oats, at least one other edible material, and water;
   cooking said ingredients;
   forming the cooked ingredients into a shape;
   cooling the formed shape into a soft, solidified mass, wherein the soft, solidified mass is self-supporting without the inclusion of any thickeners or gums; and
   dividing the soft, solidified mass into smaller portions,
   wherein the water is present in the hand-held oat food product in an amount sufficient to provide a total moisture content of from about 35% to about 60% by weight of the total hand-held oat food product.

2. The process of claim 1 further comprising packaging the smaller portions.

3. A process of making a hand-held food product according to claim 1 wherein the other edible material is selected from the group consisting of fruits, vegetables, dairy products, sugars, juices, meats, vitamins, minerals, and combinations thereof.

4. A process of making a hand-held food product according to claim 1 wherein the oats are selected from the group consisting of steel cut oats, rolled oats, whole oats, and combinations thereof.

5. A process of making a hand-held food product according to claim 2 wherein said packaging comprises individually sealing each of the smaller portions into pouches.

6. A process of making a hand-held food product according to claim 1 further comprising sterilizing the product to commercial sterilization standards.

7. A process of making a hand-held food product according to claim 6 wherein the sterilizing comprises retorting.

8. A process of making a hand-held food product according to claim 1 wherein said cooking comprises heating the ingredients for a period of time of about 20 minutes to about 60 minutes at a temperature from about 120° F. to about 240° F.

9. The process of claim 1 wherein water is present in an amount of from about 40% to about 50% by weight of the hand-held food product.

10. A process of making a hand-held food product according to claim 1 wherein said packaging comprises:
    packaging said product into a sealed container at atmospheric pressure; and
    purging the interior of the sealed container with nitrogen while the product is inside the container to substantially remove any oxygen inside the container.

11. The process of claim 10 further comprising sealing the container after said purging.

12. A process of making a hand-held food product according to claim 10 wherein the container is microwaveable.

13. A process of making a hand-held food product according to claim 10 wherein the sealed container is retortable.

* * * * *